United States Patent
Cha

(10) Patent No.: US 9,191,787 B2
(45) Date of Patent: Nov. 17, 2015

(54) TEXT RELAY SERVICE COMMUNICATION SYSTEM AND METHOD FOR A REAL-TIME TRANSMISSION OF TRANSCRIBED VOICE DATA VIA A WIRELESS PACKET NETWORK

(71) Applicant: Miracom USA, Inc., Brea, CA (US)

(72) Inventor: Wonjae Cha, Yongin-si (KR)

(73) Assignee: Miracom USA, Inc., Brea, CA (US)

( * ) Notice: Subject to any disclaimer, the term of this patent is extended or adjusted under 35 U.S.C. 154(b) by 149 days.

(21) Appl. No.: 13/905,562

(22) Filed: May 30, 2013

(65) Prior Publication Data

US 2014/0355485 A1    Dec. 4, 2014

(51) Int. Cl.
*H04L 12/16*    (2006.01)
*H04W 4/12*    (2009.01)
*H04W 76/04*    (2009.01)

(52) U.S. Cl.
CPC .............. *H04W 4/12* (2013.01); *H04W 76/045* (2013.01)

(58) Field of Classification Search
CPC ............... H04M 2201/39; H04M 2201/40; H04M 2207/18; H04M 3/567; G10L 15/26
USPC ................... 370/259; 379/52, 142.08; 381/77
See application file for complete search history.

(56) References Cited

U.S. PATENT DOCUMENTS

| | | | |
|---|---|---|---|
| 8,462,961 B1 * | 6/2013 | Bywaters et al. | 381/77 |
| 2004/0240651 A1 * | 12/2004 | Adams et al. | 379/142.08 |
| 2005/0129185 A1 * | 6/2005 | McClelland et al. | 379/52 |

* cited by examiner

*Primary Examiner* — Dang Ton
*Assistant Examiner* — Lionel Preval
(74) *Attorney, Agent, or Firm* — East West Law Group; Heedong Chae

(57) ABSTRACT

The present invention relates to a method and a system for a real time transmission of transcribed voice data via a wireless packet network of a telecommunication network used by IP-Relay or IP-CTS for deaf and hard-of-hearing individuals. The invention provides a text relay service communication system for a real-time transmission of transcribed voice data via a wireless packet network, comprising a text data receiving part for receiving text data generated and sent by a call agent; a text data transmitting algorithm part for generating dummy text data when the text data receiving part has not received any text data from the call agent for a pre-determined time period; and a text transmitting part for transmitting the text data and the dummy text data via the wireless packet network.

12 Claims, 2 Drawing Sheets

TEXT RELAY SERVICE COMMUNICATION SYSTEM AND METHOD FOR A REAL-TIME TRANSMISSION OF TRANSCRIBED VOICE DATA VIA A WIRELESS PACKET NETWORK

FIELD OF THE INVENTION

The present invention relates to a method and a system for a real time transmission of transcribed voice data ("text data") via a wireless packet network of a telecommunication network ("wireless packet network") used by Internet Protocol Relay ("IP-Relay") or Internet Protocol Captioned Telephone Service ("IP-CTS") for deaf and hard-of-hearing individuals.

BACKGROUND OF THE INVENTION

The wireless packet networks of the mobile communication network allow data transmission between a server and a client, but if there is no data transmission for a certain period of time, the mobile communication network provider disconnects the wireless link between the server and the client for efficient use of the limited resources of the wireless telecommunication network while keeping the session of the upper layer protocol. This may cause problems such as data transmission delay for IP-Relay or IP-CTS services where a real-time text data transmission is critical for effective communication with deaf and hard-of-hearing individuals. Accordingly, the object of the present invention is to eliminate such delay, caused by the disconnection configuration of the wireless packet networks, for real-time text data transmission by IP-Relay or IP-CTS services in order to provide better service and customer satisfaction.

The use of IP-Relay or IP-CTS services has increased due to a growing population of elderly people with hard of hearing as well as people with congenital or acquired hearing loss, and there is a growing need for the services to be provided to mobile communications devices such as cellular phones or smart phones where such services are limited to a fixed IP terminal of a computer under the wired or WiFi packet network environment. How IP-Relay or IP-CTS service works is as follows. First, a Call Agent ("CA") transcribes and converts what a hearing-capable user says into text data, and transmits the text data to a hearing-impaired user via IP networks. However, wireless packet networks have limited wireless resources and, they utilize a wireless resource saving feature to release wireless resources while maintaining the upper protocol session if there have been no data transmissions between a server and a client for a pre-set period of time ("T-time period"). Consequently, once the wireless resource saving feature is triggered to release wireless resources while maintaining the upper protocol session, there is a transmission delay and real-time transmission cannot be guaranteed if the server or the client tries to transmit data again because it takes time to re-allocate wireless resources to the link between the server and the client.

FIG. 1 shows a conventional process of text data transmission from a CA to a user using IP-Relay or IP-CTS via a wireless packet network.

Text data is transcribed and generated from the voice of the hearing-capable user and the CA transmits the text data to the hearing-impaired user as part of IP-Relay or IP-CTS services. In FIG. 1, the text data (n, n+1, n+2) generated by a CA is transferred to a user without delay because the transmission is being done by the active wireless connection. However, when the hearing-impaired user speaks and the hearing-capable user listens to the hearing-impaired user, text data is not generated by the CA and there is no data transmission through the wireless packet network. If there have been no data transmissions for a time exceeding the T-time through the wireless packet network, the wireless resources are released. Once the wireless resources are released and if the hearing-capable user begins to speak and the CA converts what he says into text data (n+4, n+5) and requests transmission of the text data through the wireless packet network, then the wireless packet network will begin to reallocate wireless resources to the connection between the two users in an attempt to transmit the text data (n+4, n+5). Thus, it takes time for the wireless connection to be completed and for the text data transmission to become ready again, and the text data (n+4, n+5) transmission is delayed as much as T-alive. The text data (n+6, n+7, n+8, n+9) generated after the wireless session is re-connected is transmitted without delay and transmitted almost simultaneously with the previous text data (n+4, n+5). Due to the wireless resource saving feature of the mobile packet network, conventional IP-Relay or IP-CTS service fails to maintain real time transmission of text data transcribed from voice data.

Accordingly, to solve the above problems, a need for a text relay service communication system and method for a real-time transmission of transcribed voice data via a wireless packet network has been present for a long time considering the expansive demands in the everyday life. This invention is directed to solve these problems and satisfy the long-felt need.

SUMMARY OF THE INVENTION

The present invention contrives to solve the disadvantages of the prior art. The present invention provides a method and a system for a real time transmission of transcribed voice data via a wireless packet network of a wireless packet network used by IP-Relay or IP-CTS for deaf and hard-of-hearing individuals. The real time transmission has been achieved by generating and sending dummy text data via the wireless packet network before the network releases wireless resources.

Another object of the invention is to provide a text relay service communication system for a real-time transmission of transcribed voice data via a wireless packet network, comprising a text data receiving part for receiving text data generated and sent by a call agent; a text data transmitting algorithm part for generating dummy text data when the text data receiving part has not received any text data from the call agent for a pre-determined time period; and a text transmitting part for transmitting the text data and the dummy text data via the wireless packet network.

Still another object of the invention is to provide a device for receiving transcribed voice data in real trim from a text relay service communication system via a wireless packet network, comprising a text data transmitting algorithm part for generating dummy text data when the device has not received any text data from the text relay service communication system for a pre-determined time period; and a text transmitting part for transmitting the dummy text data via the wireless packet network.

Still another object of the invention is to provide a method used by a text relay service communication system for a real-time transmission of transcribed voice data via a wireless packet network, comprising a step for receiving text data generated and sent by a call agent; a step for generating dummy text data when no text data has been received from the call agent for a pre-determined time period; and a step for transmitting the text data and the dummy text data via the wireless packet network.

The advantages of the present invention are: (1) the present invention provides a method and a system for a real time transmission of transcribed voice data via a wireless packet network in order to provide the transcribed voice data in real time to deaf and hard-of-hearing individuals; and (2) the present invention provides a means to prevent delay in transcribed voice data transmission transmitted via a wireless packet network.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings.

Figure 2:
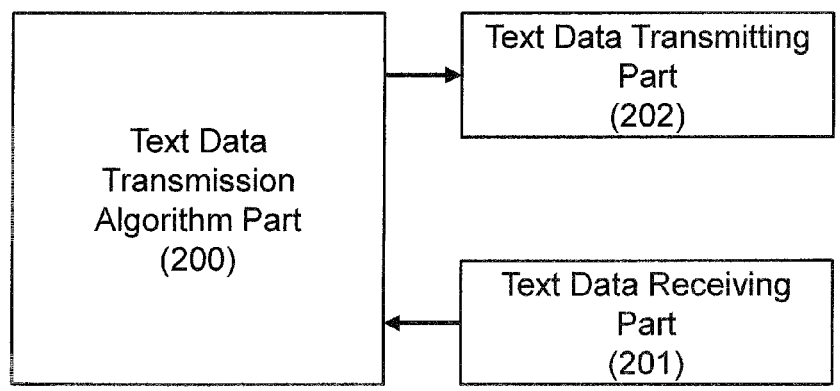
FIG. 2 shows a diagram of text data transmission system according to the present invention.

FIG. 2 shows the structure of the text data transmission system according to one embodiment of the present invention. Once the setup configuration of the services of IP-Relay or IP-CTS has been completed for text data transmission between the hearing-impaired user and the hearing-capable user, the text data receiving part 201 in FIG. 2 performs the function of receiving the text data which is transcribed by a CA from the conversation by the hearing-capable user and transmitted by the CA. The text data transmitting part 202 performs the function of transmitting the text data received from text data receiving part 201 or the dummy text data generated by the text data transmission algorithm part 200. The text data transmission algorithm part 200 transfers the text data received from the text data receiving part 201 to the text data transmitting part 202, and if text data has not been received from the text data receiving part 201 for a pre-determined time period of T-time, it generates a dummy text data and delivers it to the text data transmitting part 202 as if an actual text data has been received. Generally, if text data transmission does not occur and the wireless packet network determines there has been no text data transmission for T-time, it performs the action of releasing the wireless resources, but in the present invention, the wireless packet network detects either text data or dummy text data in each period of T-time and maintains a transmittable status continuously without releasing the wireless resources as dummy text data is generated and transmitted by the text data transmitting part 202 via the wireless packet network.

In case that a user's terminal has the feature of FIG. 2 instead of IP-Relay or IP-CTS server, the terminal can maintain the connection of the wireless resource at all times by applying the method of generating and transmitting dummy text data. If no text data has not been transmitted for T-time, the text data transmission algorithm part 200 generates the dummy text data and transmits it to the IP-Relay or IP-CTS server. Data, used in the method of keepalive of data network, may be used as dummy text data.

Figure 1:
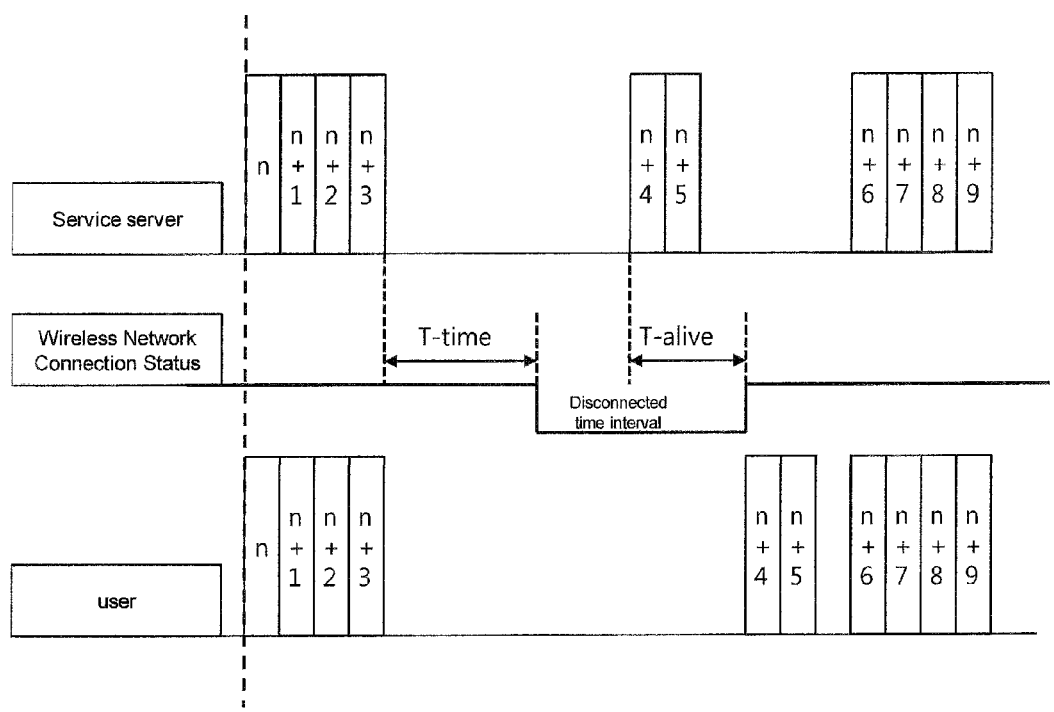
FIG. 1 shows a diagram of prior art for IP-Relay or IP-CTS.
Figure 3:
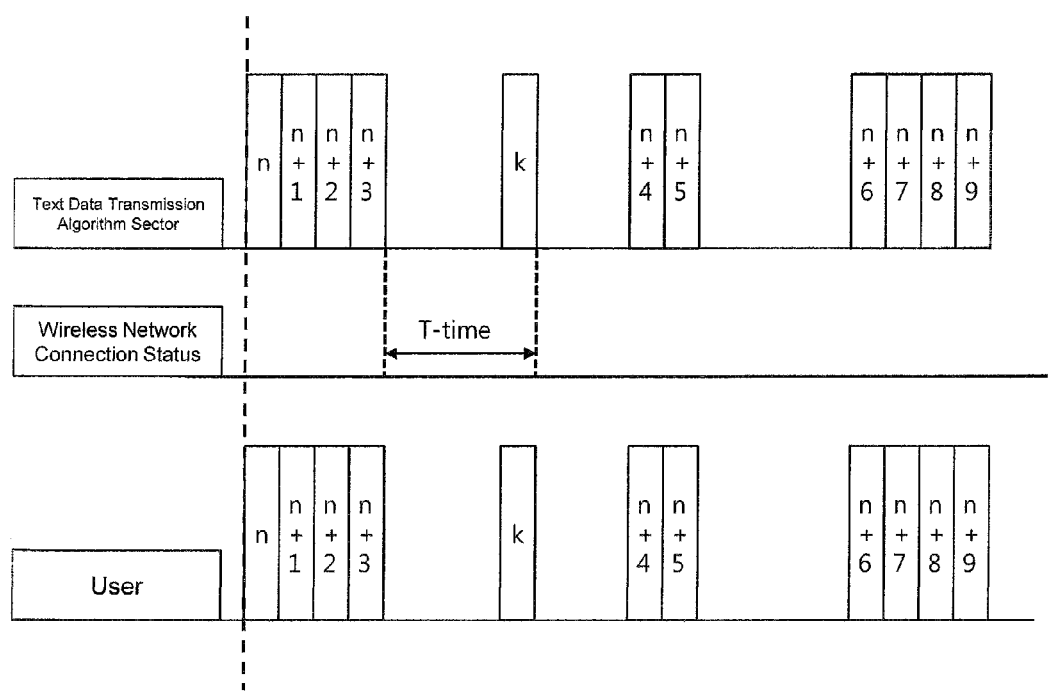
FIG. 3 shows a diagram of text data transmissions via a wireless packet network according to the present invention.

FIG. 3 shows a diagram of text data transmissions via a wireless packet network according to the present invention. Text data (n, n+1, n+2), generated by a CA and transmitted under the transferable state of the wireless packet network, does not have any delay, except the delay caused by the characteristics of the wireless packet network itself. Generally, the wireless packet network releases wireless resources to save its limited resources if no data transmission occurs for a time exceeding T-time while the hearing-impaired user speaks or text data is being generated. Once the wireless resources are released, delay in transmitting text data again is inevitable because it takes to time to re-active the once released wireless resources. However, this invention overcame such problem by the method of generating and transmitting dummy text data. The present invention determines if any text data exists during each T-time period, and if no, it generates dummy text data (k) and transmits it via the wireless packet network, preventing the wireless packet network from releasing wireless resources. As a result, new text data (n+4, n+5) can be delivered to the user without any delay because it eliminates the delay spent for recovery of the wireless resources released (T-alive in FIG. 1).

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A text relay service communication system for a real time transmission of transcribed voice data via a wireless packet network, comprising:
  a text data receiving part for receiving text data generated and sent by a call agent;
  a text data transmitting algorithm part for generating dummy text data when the text data receiving part has not received any text data from the call agent for a pre-determined time period; and
  a text transmitting part for transmitting the text data and the dummy text data via the wireless packet network;
  wherein the text data transmitting algorithm part receives the text data from the text data receiving part and transfers the text data to the text transmitting part;
  wherein the text data transmitting algorithm part sends the dummy text data to the text transmitting part;
  wherein the pre-determined time period is set by a wireless packet network provider to release wireless resources of the wireless packet network if there is no data transmission transmitted from the text relay service communication system via the wireless packet network.

2. The text relay service communication system of claim 1, wherein the text relay service communication system is IP-relay or IP-CTS.

3. The text relay service communication system of claim 1, wherein the dummy text data is the text data last received from the call agent before expiration of the pre-determined time period.

4. The text relay service communication system Of claim 1, wherein the dummy text data is a keepalive signal used by the wireless packet network provider to prevent network sessions from being broken.

5. A device for receiving transcribed voice data in real time from a text relay service communication system via a wireless packet network, comprising:
  a text data transmitting algorithm part for generating dummy text data when the device has not received any text data from the text relay service communication system for a pre-determined time period; and a text transmitting part for transmitting the dummy text data via the wireless packet network;

wherein the pre-determined time period is set by a wireless packet network provider to release resources Of the wireless packet network if there is no data transmission between the device and the text relay service communication system via the wireless packet network.

6. The device of claim 5, wherein the text relay service communication system is IP-relay or IP-CTS.

7. The device of claim 5, wherein the dummy text data is the text data last received from the text relay service communication system before expiration of the pre-determined time period.

8. The device of claim 5, wherein the dummy text data is a keepalive signal used by the wireless packet network provider to prevent network sessions from being broken.

9. A method used by a text relay service communication system for a real-time transmission of transcribed voice data via a wireless packet network, comprising:

a step for receiving text data generated and sent by a call agent;

a step for generating dummy text data when no text data has been received from the call agent for a pre-determined time period; and a step for transmitting the text data and the dummy text data via the wireless packet network;

wherein the pre-determined time period is set by a wireless packet network provider to release wireless resources of the wireless packet network if there no data transmission from the call agent via the wireless packet network.

10. The method of claim 9, wherein the text relay service communication system is IP-relay or IP-CTS.

11. The method of claim 9, wherein the dummy text data is the text data last received from the call agent before expiration of the pre-determined time period.

12. The method of claim 9, wherein the dummy text data is a keepalive signal used by the wireless packet network provider to prevent network sessions from being broken.

* * * * *